(12) United States Patent
Fukuhara et al.

(10) Patent No.: US 6,501,862 B1
(45) Date of Patent: Dec. 31, 2002

(54) PICTURE INFORMATION PROCESSING METHOD AND APPARATUS AND ENTERTAINMENT APPARATUS

(75) Inventors: Takahiro Fukuhara; Keisuke Kato, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,168

(22) Filed: Apr. 1, 1999

(30) Foreign Application Priority Data

Apr. 3, 1998 (JP) .......................................... P10-091992

(51) Int. Cl.$^7$ ................................................. G06K 9/36
(52) U.S. Cl. ........................................ 382/249; 382/233
(58) Field of Search ................................. 382/249, 243, 382/244, 248, 232–233, 241, 276; 358/426, 432–433; 345/582–587, 660; 375/240.09, 240.18, 240.24, 240.25

(56) References Cited

U.S. PATENT DOCUMENTS

| | | | | |
|---|---|---|---|---|
| 4,941,193 A | * | 7/1990 | Barnsley et al. | ............ 382/249 |
| 5,065,447 A | * | 11/1991 | Barnsley et al. | ............ 382/249 |
| 5,347,600 A | * | 9/1994 | Barnsley et al. | ............ 382/249 |
| 5,768,437 A | * | 6/1998 | Monro et al. | ............... 382/249 |
| 6,266,451 B1 | * | 7/2001 | Charrier et al. | ............ 382/249 |
| 6,373,989 | * | 4/2002 | Fukuhara et al. | ........... 382/241 |

* cited by examiner

Primary Examiner—Leo Boudreau
Assistant Examiner—Ishrat Sherali
(74) Attorney, Agent, or Firm—Sonnenschein, Nath & Rosenthal

(57) ABSTRACT

A game machine for high-speed execution of iterated transformation decoding based on a drawing command or data loaded from a recording medium. The drawing command, fractal transformation parameters or data loaded from a recording medium 24 are stored in a main memory 21. A drawing texture, expanded on a VRAM 23 in a graphics processing unit 22, is iteratively transformation decoded in accordance with the drawing command or the fractal transformation parameters transferred under control of the CPU 20. The generated texture is displayed as a picture on a CRT 32 of the graphics processing unit. This realizes high-speed iterated transformation decoding of the texture and a restored picture of high picture quality while realizing iterated transformation decoding with a significantly reduced calculation volume.

3 Claims, 15 Drawing Sheets

PICTURE INFORMATION PROCESSING METHOD AND APPARATUS AND ENTERTAINMENT APPARATUS

BACKGROUND OF THE INVENTION

1. Field of the Invention

This invention relates to a picture information processing method and apparatus and an entertainment apparatus. More particularly, it relates to such a picture information processing method and apparatus and an entertainment apparatus in which a picture is generated by iterated transformation decoding processing.

2. Description of the Related Art

As a conventional typical picture compression system, there is known a so-called JPEG (Joint Photographic Coding Experts Group) standardized by ISO. This JPEG system uses the DCT (discrete cosine transform) and is known to achieve optimum encoded or decoded pictures subject to assignment of a larger volume of bits. However, if the number of encoding bits is decreased, block distortion proper to DCT becomes outstanding to render subjective deterioration more apparent.

On the other hand, a picture compression system utilizing the IFS (iterated function systems) is recently stirring up notice. This system exploits the self-similarity of a picture on the premises that, if a portion of the picture is taken out, there exists in the picture another picture portion strongly resembling the taken-out picture portion. This IFS system has a merit that decoding is not dependent at the time of decoding on resolution because the block distortion is not apparent as in JPEG and self-similarity between blocks of different sizes in the picture is exploited. This IFS system, also termed fractal encoding, is retained to be promising in a variety of the fields of application.

The technique described in Japanese Laying-Open Patent 5-57062 exploits the function proper to the fractal encoding, that is the function of restoring the picture with a smaller information volume, in a game machine. Referring to FIG. 1, showing a block diagram for this technique, there are connected, to a system bus 62 to which is connected a CPU 50, a work VRAM 51, a ROM 52, an external interface (I/F) 53, a fractal drawing unit 55, a GDC (graphics display controller) 57 and a keyboard (KB) I/F 60. To the external I/F 53 is loaded a game ROM 54. A VRAM (video RAM) 56 is connected to the fractal drawing unit 55 and to the GDC 57, while a CRT (cathode ray tube) 59 is connected via a graphic I/y 58 to the GDC 57 and a keyboard 61 is connected to the KBI/Fxy 60.

The operation of the above-described configuration is as follows:

When the game ROM 54 is loaded on the I/F 53, and the power is turned on by actuation of a power source switch, a pre-set amount of the leading end portion of the game software is read from the game ROM 54 for storage in the work VRAM 51. An initial picture contained therein is transferred to the GDC 57, which then expands the transferred initial picture on the VRAM 56 and reads it at a pre-set period in order to transfer the read-out picture to the graphic I/F 58 and output the picture on the CRT 59. On reception of a command entered by a user from the keyboard 61 via KB I/F 60, the CPU 50 reads out corresponding figure data from the work VRAM 51, in accordance with the command, to transfer the read-out data to the GDC 57 or to send a command for movement of the displayed figure to the GDC 57 to update the displayed picture.

In the game software, read out from the game ROM 54 via the external I/F 53 and stored in the work VRAM 51, there are contained, in addition to the conventional control program and figure data, a fractal figure drawing command and a program. The fractal figure drawing command and the program are made up of equations setting out rules for figure formulation (algorithms) and initial values on the starting positions for figure drawing. If data read out from the work VRAM 51 in accordance with the command etc entered from the keyboard 61 is the fractal figure drawing command rather than the figure data, the CPU 50 transfers the command to the fractal drawing unit 55, rather than to the GDC 57. On reception of the command, the fractal drawing unit 55 sequentially generates figure elements, such as line segments, in accordance with the initial values and equations, and expands the generated figure elements on the VRAM 56 to draw natural objects, such as mountains, trees or leaves of the trees, or characters. It is thus possible to draw complex figures of larger data volumes in accordance with the fractal picture drawing commands of a smaller data volume.

In the aforementioned Japanese Laying-Open Patent 5-57062, there is made no specified explanation as to which fractal drawing command should be given to draw which pictures.

In the above-described prior-art example, in which the fractal figure is drawn in accordance with the picture-drawing command, the figures that can be drawn are limited such that there is not provided the function of compressing and restoring the natural pictures or textures at large.

Independently of the above-described technique, there is employed the JPEG system as the compressing encoding technique for a texture (picture) in case of effecting texture mapping to an object shape frequently used in a personal computer or on a game machine. The result is that, since the apparent resolution of the texture is increased on zooming the object shape, the block distortion proper to DCT is enlarged to render the picture deterioration more apparent to give a blurred displayed picture devoid of sharpness.

SUMMARY OF THE INVENTION

It is therefore an object of the present invention to provide a picture information processing method and apparatus and an entertainment apparatus whereby a decoded picture less susceptible to deterioration of the picture quality of the texture on zooming the object shape obtained on texture mapping.

A picture information processing apparatus according to the present invention includes main memory means for storage of data containing fractal transformation parameters, picture processing means for effecting iterated transformation decoding using the fractal transformation parameters stored in the main memory means to generate a picture, picture storage means for expanding a picture generated by the iterated transformation decoding, display control means for display-controlling the generated picture, actuation inputting means, and control means for controlling the processing by the picture processing means and the display operation by the display control means responsive to an actuating input from the actuation inputting means.

According to the present invention, an initial picture is restored at the time of effecting iterated transformation decoding using fractal transformation parameters stored in the main memory means and iterated transformation decoding employing the fractal transformation parameters is effected based on the restored initial picture to generate a picture.

By an actuating input, an iteratively transformation decoded picture is generated and decoded. By effecting iterated transformation decoding based on the restored initial picture, the iterative transformation decoded picture can be generated at a high speed with a smaller number of tomes of reiteration.

According to the present invention, a picture is generated by iterated transformation decoding using fractal transformation parameters stored in the main memory means. The picture generated on iterated transformation decoding is expanded on picture storage means. The generated picture is display-controlled and the picture processing and display is controlled responsive to the actuating input from the actuating input means to effect iterated transformation decoding of a picture, such as texture, at an elevated speed responsive to actuation.

Since the initial picture is restored, and a picture is generated by iterated transformation decoding based on the restored initial picture, the iterative transformation decoded picture can be generated at a higher speed than if a picture is generated by iterated transformation decoding from an optional initial picture.

By using a decoded version of a pre-encoded initial picture, the data volume can be reduced for the initial picture.

By providing a geometry calculation unit for effecting high-speed calculation of the geometrical information, such as coordinates of the polygon on which to map the texture, it is possible to obtain a more realistic texture-mapping picture.

By providing a cache memory in the main memory, and by storing and transferring data such as the drawing command or fractal transformation parameters, it is possible to realize an elevated overall processing speed.

By providing a texture cache in the picture processing means, the drawing texture can be accessed and transferred at an elevated speed to elevate the drawing speed.

By directly copying a portion of plural pixels as a transformation unit in a domain block in a range block, at the time of restoring an initial picture and effecting iterated transformation decoding based on the restored initial picture, by way of the contracting picture transformation processing, the volume of calculations can be significantly diminished to enable high-speed processing.

Moreover, by generating an enlarged picture by iterated transformation decoding another enlarged picture generated prior to the first-stated enlarged picture, at the time of effecting zoom display using enlarged pictures of plural stages, the processing volume can be reduced significantly to elevate the processing speed and to realize effective utilization of the work area of the picture memory.

DESCRIPTION OF THE PREFERRED EMBODIMENTS

Figure 1:
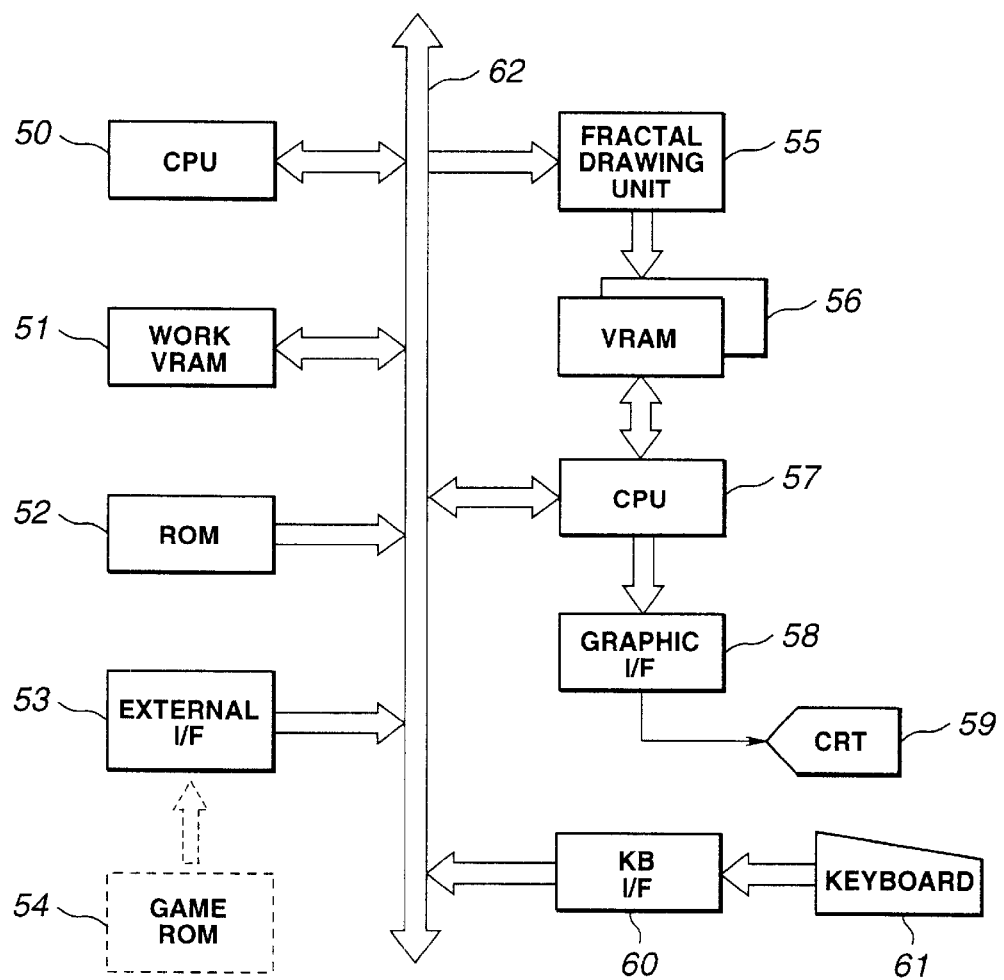
FIG. 1 is a block diagram showing an illustrative structure of a conventional technique.

Referring to the drawings, preferred embodiments of the present invention will be explained in detail.

Figure 2:
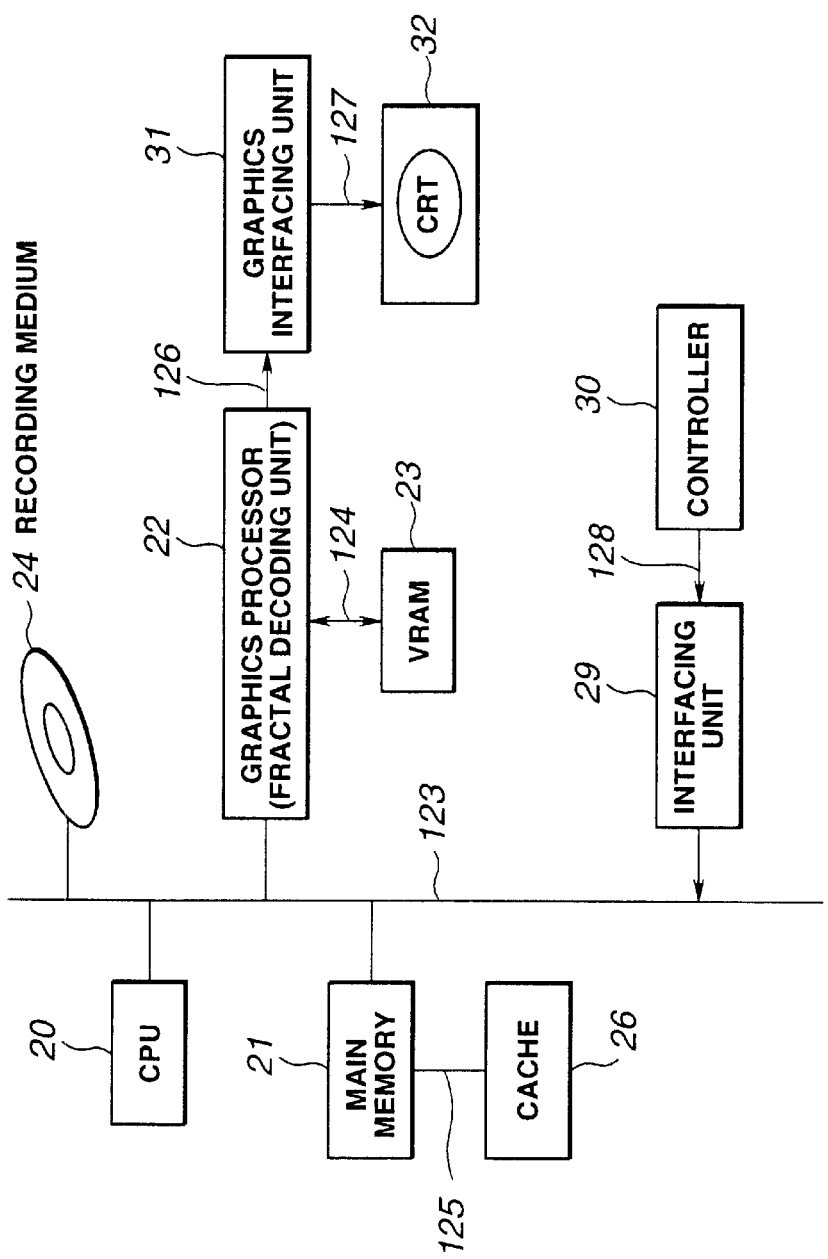
FIG. 2 is a block diagram showing the schematic structure of an apparatus according to an embodiment of the present invention.

FIG. 2 schematically shows the structure of an entertainment device, such as a game machine, loaded with the fractal decoding function, that is the function of iterated transformation decoding a picture, as a picture information processing apparatus as a first embodiment of the present invention.

The device shown in FIG. 2 includes a CPU 20, as control means for controlling the entire device, a main memory 21, as main memory means for storing data including fractal transformation parameters, a graphics processing unit 22, as image processing means for generating an image by effecting iterated transformation decoding using the above-mentioned fractal transformation parameters for generating an image, a VRAM 23, as image storage means for expanding the picture generated by the iterated transformation decoding, a recording medium 24, such as a so-called CD-ROM or ROM cassette, a cache memory 26 connected to the main memory 21, a controller 30 for user input, and an interfacing unit 29 for the controller 30. The device also includes a CRT (cathode ray tube) 32 on which the generated picture is displayed, and a graphics interfacing unit 31 for displaying an image on the CRT 32.

Although the CRT 32 is provided as-one with the present device, it may be omitted if a television receiver for household use or a monitor device for a personal computer is used.

The above-described device operates as follows:

Referring to FIG. 2, the interfacing unit 29 receives the command information 128 sent from the controller 30 to transfer the command information 128 as the control information via main bus 123 to the CPU 20. The CPU 20 on reception of the control information causes fractal transformation parameters recorded on the recording medium 24 to be read out via main buys 123.

The fractal transformation parameters, read out from the recording medium 24, are sent over the main bus 123 so as to be transiently stored and held in the main memory 21 or in the annexed cache memory 26. If a cache memory is annexed to the CPU 20, and the data volume is such as can be stored in this cache memory, the fractal transformation parameters can be stored and saved in this cache memory annexed to the CPU 20. The fractal transformation parameters are then transferred to the graphics processing unit 22 under control by the CPU 20.

Here, the initial picture or the initial decoded picture, also referred to below as the drawing texture, is expanded on the VRAM 23. Then, the expanded drawing texture (initial picture) 124 is processed with iterated transformation decoding (fractal decoding), based on the fractal transformation parameters, to generate a picture. If, as a matter of structure, a texture cache unit is provided in the inside of the graphics processing unit 22, the drawing texture (initial picture) 124 can be stored and saved in this texture cache unit and processed with the above-mentioned fractal decoding, so that expectations may be made for a higher processing speed.

Figure 3:
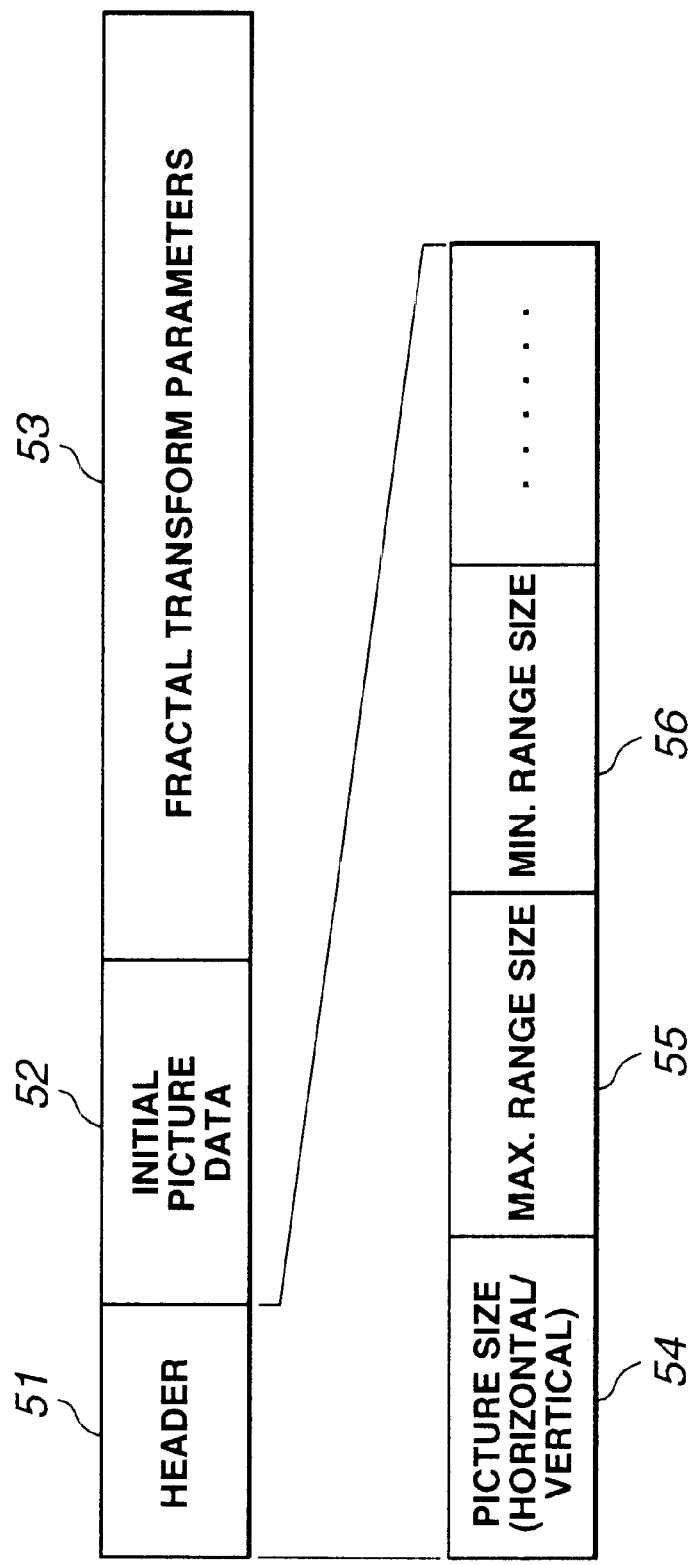
FIG. 3 shows the structure of data stored in a recording medium.

FIG. 3 shows the data structure including the above-mentioned initial picture (drawing texture and data) and the fractal transformation parameters. Referring to FIG. 3, there are arrayed in a header 51 the picture size information (both horizontal and vertical information) 54, the maximum range size information 55 and the minimum range size information 56. Next to the header 51 are arrayed initial picture (initial decoded picture, drawing texture) data 52 and fractal transformation parameters 53, in this order.

A restored texture 126, generated by the graphics processing unit 22, is D/A converted by the graphics interfacing unit 31 to output video signals 127 to the CRT 32.

Figure 4:
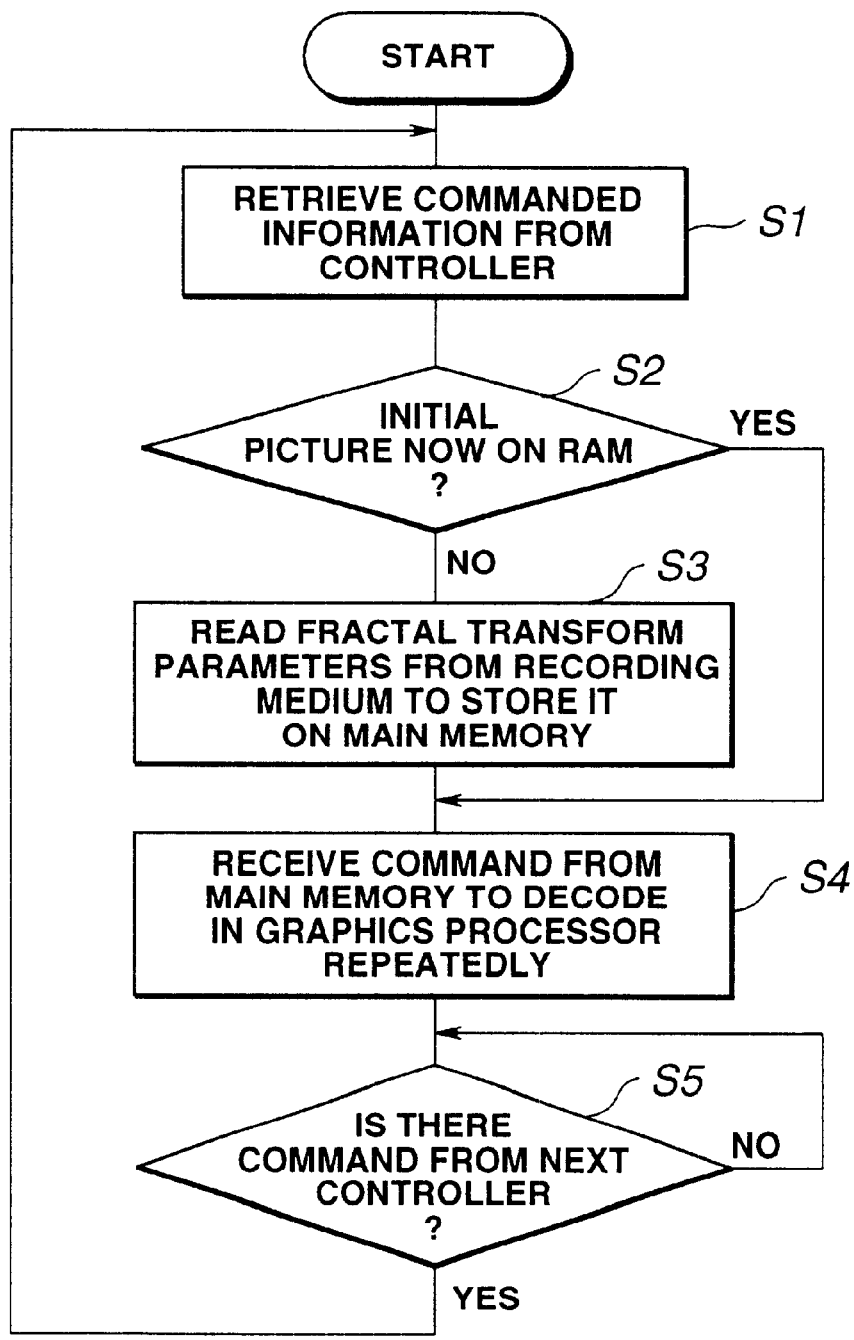
FIG. 4 is a flowchart for showing the process of generating the texture by executing drawing commands to effect iterated functional synthesis.

The operation of effecting re-drawing, such as zooming, on the texture once expanded on the VRAM, is explained with reference to the flowchart of FIG. 4.

First, at step S1, the command information 128, issued as described above by the controller 30, is captured. At the next step S2, it is verified by the CPU 20 whether or not the drawing command is related with the texture currently expanded on the VRA. It is assumed that fractal transformation parameters handled here are distinct from the fractal transformation parameters of FIG. 3, and may be enumerated by, for example, texture rotation, movement, deformation or the enlargement/contraction ratio. These fractal transformation parameters are transiently stored and saved in a main memory or a cache memory at step S3 in the same fashion as explained previously. At the next step S4, the processing such as rotation, movement, deformation or enlargement/contraction ratio is carried out, in accordance with the fractal transformation parameters. The drawn texture is outputted to the graphics interfacing unit 31. The operations are subsequently similar to that explained previously. Meanwhile, at step S5 of FIG. 4, it is detected whether or not there is the next command from the controller 30. It there is such command, processing reverts to step S1.

First, the operation of texture restoration by the graphics processing unit 22 is explained. This operation is specifically shown in the block diagram of FIG. 5 which shows the decoder configuration. The corresponding encoder configuration is shown in FIG. 6.

First, the decoder operation is explained with reference to FIG. 5.

On a picture in a domain block on a texture expanded on the VRAM 23, obtained as the domain block information 115, the processing such as rotation, translation, expansion or contraction, is performed in accordance with fractal transformation parameters 106 explained with reference to FIG. 2. This gives a transformed domain block picture 116 which is stored and saved at a first block position in a picture memory 16. This operation means the operation of iterated transformation decoding of the drawing texture 124 by the fractal transformation parameters for storage and saving in the VRAM 23. The controller 17 of FIG. 5 is added sa portion of the control performed by the CPU 20 of FIG. 2.

Figure 7:
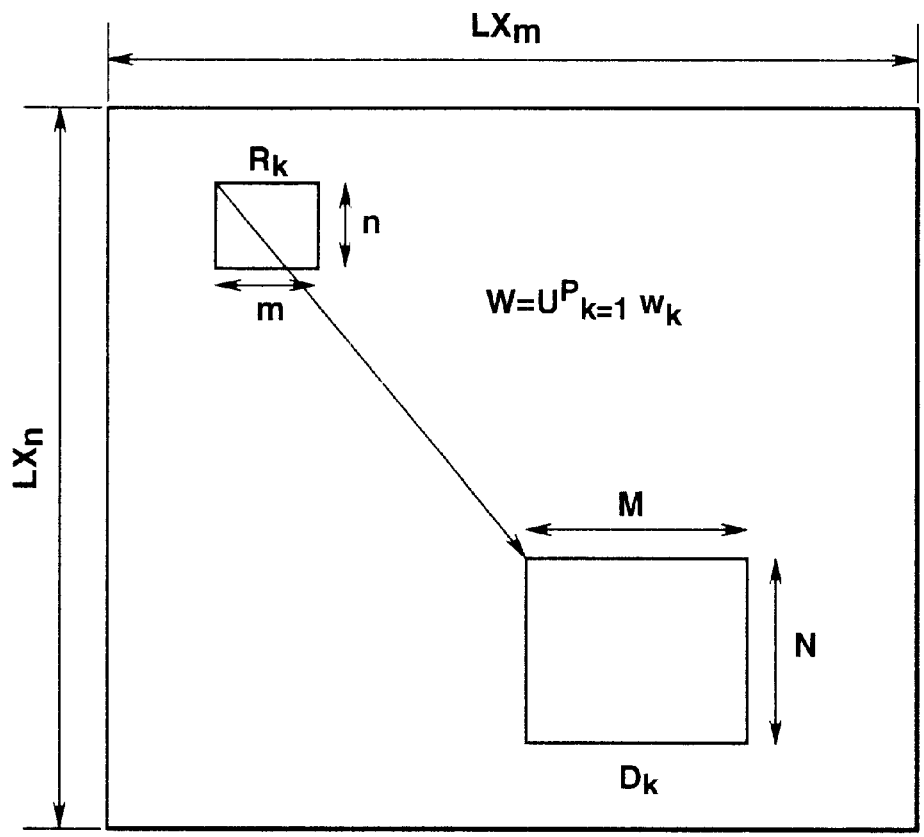
FIG. 7 shows mapping transformation between a domain block and a range block.

Referring to FIG. 7, the basic concept of the iterated transformation decoding carried out in the graphics processing unit 22 and the related encoding is explained with reference to FIG. 7.

The basic structure of the iterated transformation encoding is shown in, for example, Arnaud E. Jaquin, "Image Coding based on a Fractal Theory of Iterated Contractive Image Transformations", IEEE Transactions on Image Processing, vol.1, no.1, pp. 18 to 30.

The iterated transformation decoding is usually a technique of iterating contractive image mapping transformation from a domain block picture to a range block picture for the totality of the range block pictures making up a picture to converge the entire picture to generate a restored picture. On the encoder side, it is sufficient to encode the transformation parameters and the position information of a domain block most strongly resembling each range block.

In FIG. 7, a range block Rk and a domain block Dk are equivalent to the first block picture 101 and to the second block picture 102, respectively. The block sizes of Rk and Dk are set to mxn and MxN, respectively. FIG. 7 shows that the entre picture has LxL range blocks. These block sizes of the range blocks and the domain block are elements significantly influencing the encoding efficiency and hence the size setting is crucial.

Also, block picture transformation in a picture transformation generating unit 15 is the transformation from Dk to Rk. If the mapping function to the block Rk is $w_k$ and the number of blocks of the domain block required for mapping transformation of the entire picture is P, a picture f is mapped, by a mapping function W for the entire picture, to $$W(f) = w_1(f) \cup w_2(f) \cup \ldots \cup w_P(f) \qquad (1)$$

so that W is given by the following equation:

$$W = U_{k=1}^{P} w_k. \qquad (2)$$

It is noted that any suitable mapping function w may be used on the condition that convergence is achieved. For assuring the convergence, a contracting mapping is frequently used. For simplicity of processing, affine transformation is frequently used. If mapping of Dk to Rk by the affine transformation is expressed by an equation, using an actual transformation function $v_i$, the following equation (3):

$$vi(x, y) = \begin{bmatrix} ai & bi \\ ci & di \end{bmatrix} \begin{bmatrix} x \\ y \end{bmatrix} + \begin{bmatrix} ei \\ fi \end{bmatrix} \qquad (3)$$

is obtained.

This equation (3) can express all transformations between two blocks, such as rotation, translation, contraction and enlargement. The picture transformation generating unit 15 of FIG. 5 has a circuit for effecting transformation, such as rotation, translation, contraction and enlargement, represented by the equation (3), enclosed therein, and processes the domain block picture 115 with transformation processing, using the transformation parameter information 106, to produce a transformed domain block picture 116.

The above-mentioned example shows the block transformation with respect to the spatial coordinates. However, affine transformation may similarly be applied to pixel values, for example, gray level values, such as luminance or chroma information, for mapping transformation. For simplicity sake, the following equation (4):

$$v_i(d_i) = s \times d_i + c \quad (4)$$

represents the relation in which a pixel value $d_i$ in a domain block $D_k$ is mapped to a pixel value $r_i$ of the range block $R_k$.

In the above equation, s and o can be defined as contrast, referred to in the above treatise as contrast scaling, and an offset value, referred to in the above treatise as luminance shift, respectively. It suffices in this case to calculate the parameters s and c which will minimize the square sum of error differences from the pixel values ri in the range block $R_k$. That is, it suffices to set so that $$\Sigma(s \times d_i + o - r_i)2 \rightarrow \text{minimum value} \quad (5).$$

Figure 8:
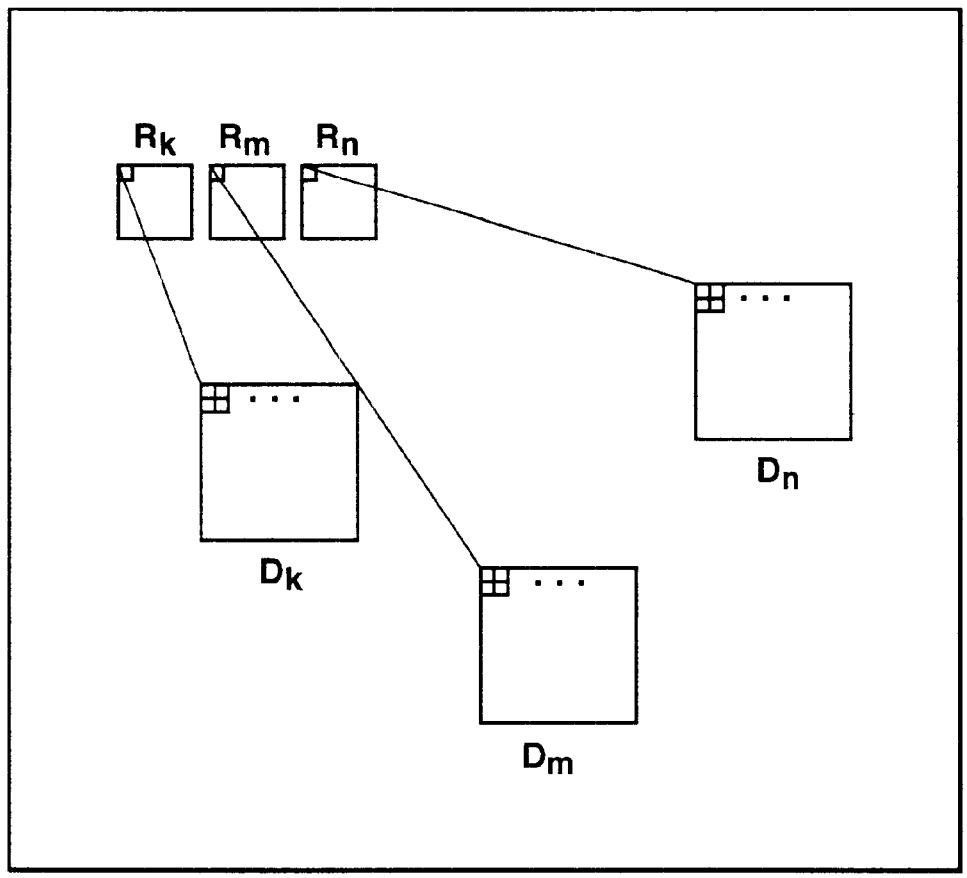
FIG. 8 shows an example of converting the picture mean of the domain block to a pixel value of the range block.

FIG. 8 illustrates the technique of employing a mean pixel value in case the domain block size is twice the range block size both vertically and horizontally. That is, Referring to FIG. 7, with the mean value $d_i$ of four pixels as transformation units of the domain block $D_k$, as shown in FIG. 7, it is necessary to perform the operation of computing $v_i$, using the above equation (4), and to substitute this as a pixel value of the transformed position of the corresponding range block $R_k$ by way of overwriting. Therefore, the calculations of (three additions and one division)+(one addition and one multiplication)=(four additions, one division and one multiplication)

are required.

The picture transformation generating unit 4 of FIG. 6 has, enclosed therein, a circuit for effecting a series of affine transformations, such as rotation, translation, contraction and enlargement, represented by, for example, the above equation (3), and effects position transformation in the picture on the second block picture 104. The gray level values of the pixels in the block can similarly be realized using the affine transformations. The second block picture 104 can be processed with transformation using different values of the transformation coefficients ($a_i$, $b_i$, $c_i$, $d_i$, $e_i$ and $f_i$) of the equation (3) to derive the transformed block picture 105. The proximity degree measurement and threshold processing for the transformed block picture 105 and the first block picture 101 are effected in an proximity degree measuring and threshold processing unit 10 and a second block picture with the least error is selected. The first block picture information 103, second block picture information 129 and the transformation parameters, that is the transformation coefficient of the equation (3), are multiplexed by an encoding and multiplexing unit 8 and outputted. The above is the technique and the basic structure of the iterated transformation encoding and decoding.

The operation of the expansion of the drawing texture is explained.

Figure 9:
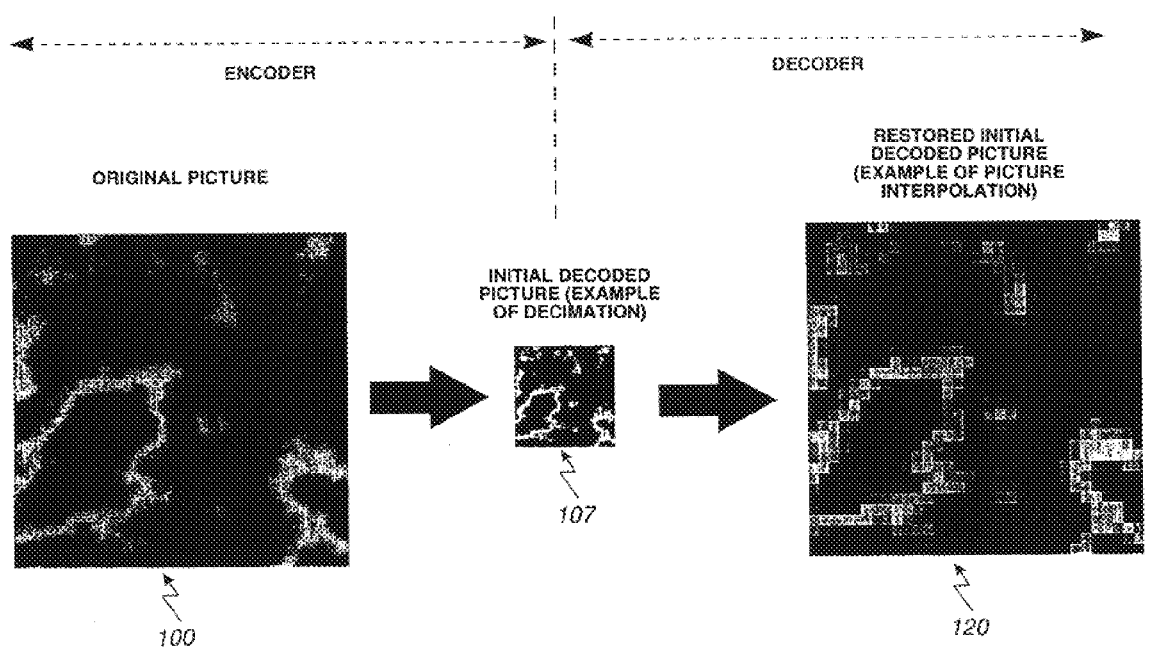
FIG. 9 shows the case of generating an initial picture using the variance of pixel values in a block.

Referring to FIG. 9, an input picture as an original picture, that is an original picture 100 shown in FIG. 6, is shown at the left end. An initial picture (initial decoded picture or a drawing texture) 107 is shown at the center in this figure, the texture of the original picture is downsampled (thinned) by ¼ both vertically and horizontally, thus by 1/16 as a whole. Other methods will be explained subsequently. The above is the processing by an encoder. The generated initial picture 107 is multiplexed by the multiplexer 8, as shown in FIG. 6, and subsequently outputted along with the other encoded information.

On the other hand, the decoder effects upsampling (pixel interpolation) of converting the downsampled initial decoded picture 107 to the original resolution. FIG. 9 shows the manner in which the initial decoded picture 107 is upsampled to a restored initial decoded picture 120. Although the information on the texture of the original picture is lacking, the texture information is compressed to, for example, (¼)×(¼)=1/16, by simple calculation.

In the above-described first embodiment of the present invention, fractal transformation parameters or picture drawing commands or data, loaded from the recording medium 24, such as CD-ROM or ROM cassettes, are stored in the main memory 21, and the drawing texture (initial picture) expanded in the VRAM 23 are iteratively transform-decoded in the graphics processing unit 22, whereby the texture can be iteratively transform-decoded at an extremely high speed.

Figure 5:
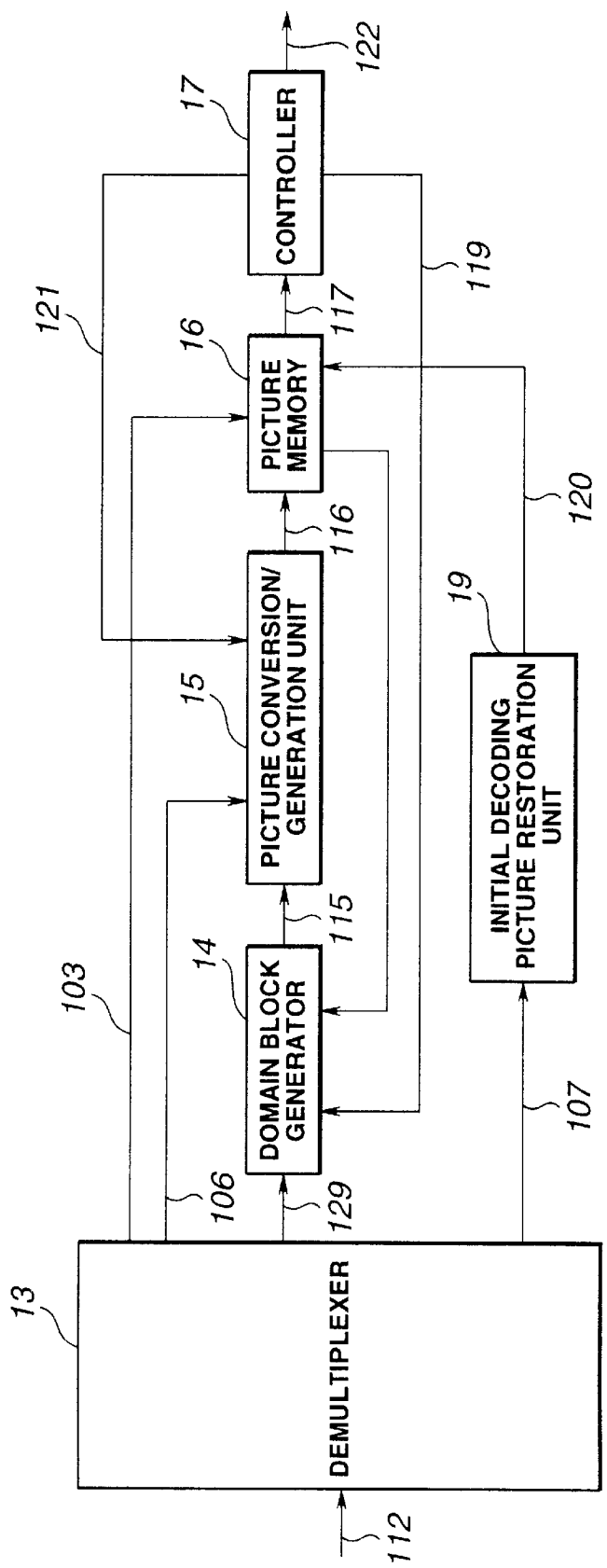
FIG. 5 is a block diagram showing the structure of the iterated function synthesis unit of a graphics processing unit.
Figure 6:
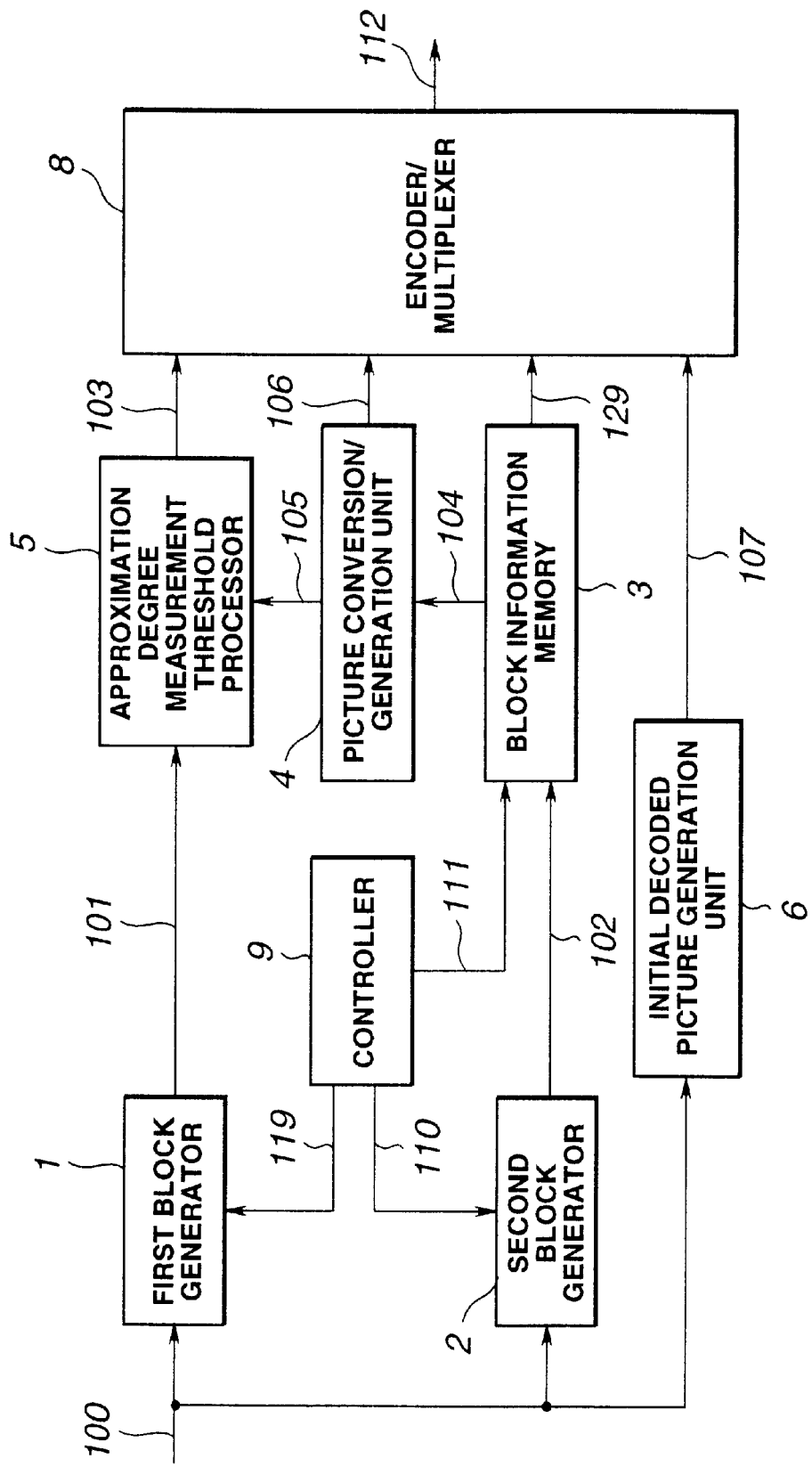
FIG. 6 is a block diagram showing the structure of the iterated function synthesis unit.

Also, since an initial decoded picture restoration unit 19 is provided in the graphics processing unit 22, as shown in FIG. 5, for restoring the initial decoded picture (initial picture and drawing texture), and the iterated transformation decoding is carried out on this restored picture, the decoded picture is of optimum picture quality.

The initial decoded picture, on which the iterated transformation decoding is performed, may be lowered in resolution than the original picture due to downsampling, or compressed by a texture decoder with the original resolution, thus significantly reducing the number of times of iteration required until restoration of the pre-set picture in comparison with the case of effecting iterated transformation decoding the black initial picture as conventionally. The processing speed is also elevated due to the reduction in the processing time.

By providing a texture cache in the graphics processing unit 22, the drawing texture can be accessed and transferred at an elevated speed to raise the drawing speed.

A second embodiment is hereinafter explained.

The above-described first embodiment is directed to a configuration in which the initial picture (initial decoded picture or the drawing texture) 107 is generated on simply downsampling the texture of the original picture. However, the initial picture may be generated by the hierarchical structure composed of plural block sizes, as shown in FIG. 10.

Figure 10:
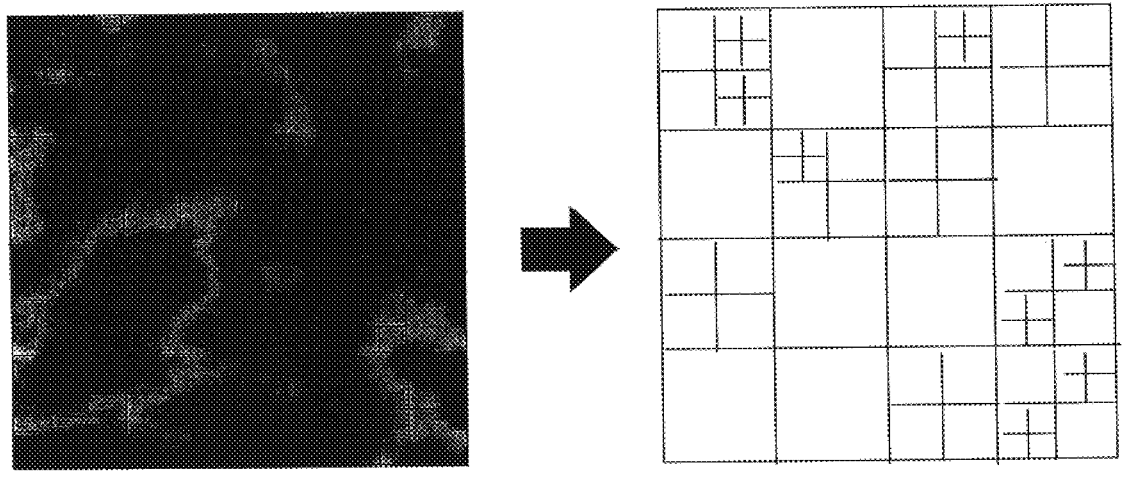
FIG. 10 shows the case of generating an initial picture using the variance of the pixel values in the block.

In the embodiment of FIG. 10, the starting block is of a larger size. If the variance of the pixel values in a block exceeds a pre-set threshold value, the block is divided into four equal parts, in order to derive an initial picture (initial decoded picture or the drawing texture). The example of FIG. 10 shows a set of blocks of a three-layered hierarchical structure from 32×32 blocks to 8×8 blocks. The pixels in each block are represented by a sole pixel value.

In this second embodiment, the plain structure portion of a picture is coped with by a large block, while complex patterns can be coped with by finer blocks, so that an initial decoded picture of high picture quality can be restored with the same compressed data in comparison with the simple downsampling method explained in connection with the first embodiment.

A third embodiment is hereinafter explained.

The above-described first and second embodiments are essentially based on the technique of getting plural pixel values represented by a sole pixel value. This is a system of the smallest calculation load and has a merit of reducing the hardware or software processing. However, the compression ratio is low.

On the other hand, if a JPEG encoder, for example, is loaded on an initial decoded picture generating unit 6, the hardware cost is raised, however, there may be obtained a merit that a picture obtained on decoding by the decoder is only corrupted with errors that can hardly be detected on compression to the order of a few one-hundredths In such case, the JPEG decoder is loaded on the initial decoded picture restoration unit 19.

Figure 11:
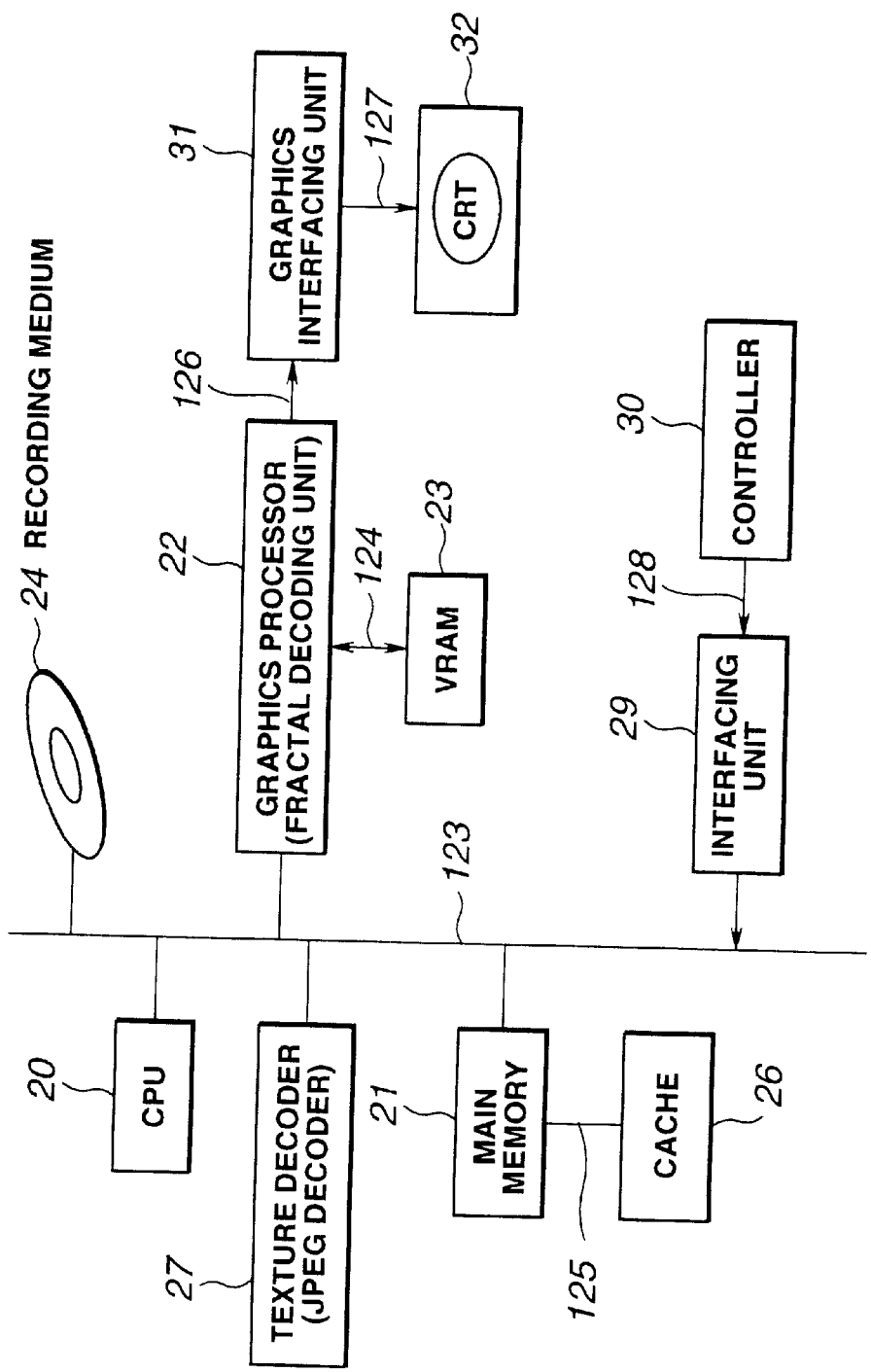
FIG. 11 is a block diagram showing a schematic structure of a device according to a third embodiment of the present invention.

FIG. 11 shows a third embodiment in which this is implemented by connecting a texture decoder 27 to the main bus, decoding the encoding information read out from the recording medium 24 and by expanding the restored texture via the main bus 123 on the VRAM 23.

In the above-described third embodiment, the JPEG encoder and the decoder are implemented by the hardware. Alternatively, the JPEG encoder and the decoder may be implemented by software by using calculations in the CPU 20 in FIG. 2.

In the present third embodiment, a texture decoder is a JPEG decoder, for example, and an initial picture, previously encoded by, for example, JPEG encoding, that is initial decoded picture or a drawig texture, is decoded, such as by JPEG decoding, and expanded on the VRAM, thus allowing to compress data significantly.

A fourth embodiment is hereinafter explained.

In the above-described first embodiment, the pixel values are transformed by the technique shown in the above equation (4). In this case, it is necessary to execute one multiplication and one addition for contrast and brightness. However, if this is to be realized by the hardware, such as by a graphics chip, the processing volume is prohibitively increased if the multiplication and the addition are to be carried out simultaneously. Also, the technique shown in the equation (4) cannot be coped with in certain hardware structures.

The above difficulties can be overcome by reducing the multiplication and the addition of the twp parameters of the equation (4) to one. It is crucial how this is to be realized while minimizing the deterioration of the picture quality.

Figure 12:
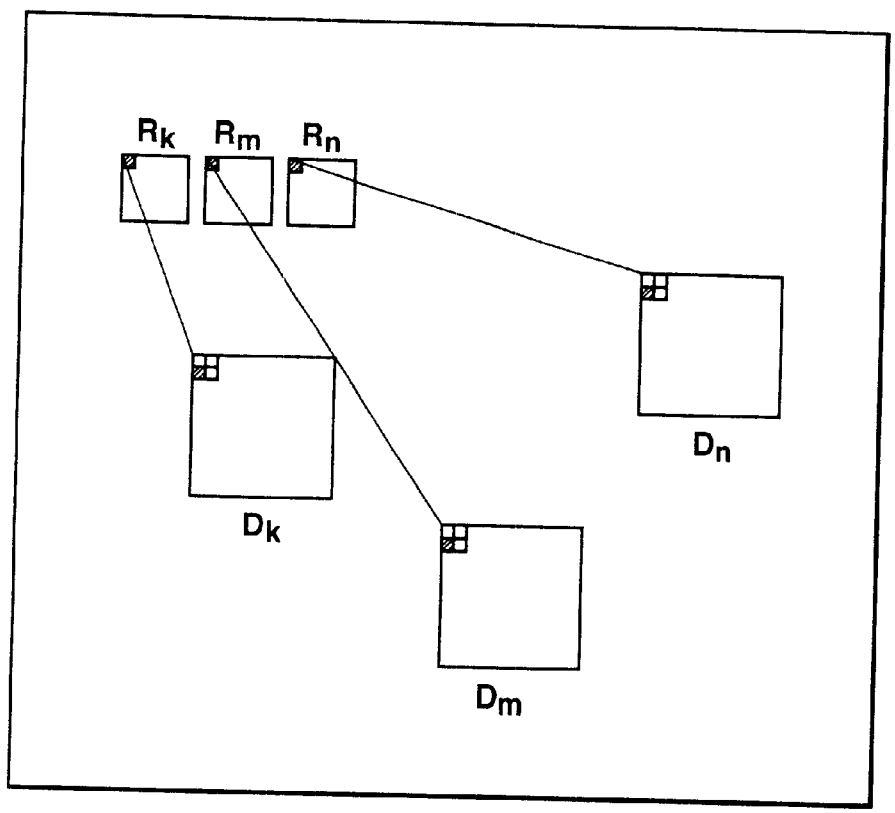
FIG. 12 shows an example of converting a pixel value in a transformation unit of a domain block to a pixel value of a range block.

FIG. 12, similarly to FIG. 8, shows a picture in which the domain block size is twice the range block size both horizontally and vertically (½ contracting picture transformation). For reducing the volume of calculations, a certain pixel of four pixels representing a transformation unit of the domain block $D_k$, for example, the pixel at the lower left end of the four pixels of the transformation unit, is directly set as $d_i$, without taking the mean of the four pixels of the transformation unit of the domain block $D_k$, and is overwritten at a transformation position of the range block $R_k$. Since this case corresponds to c=1, b=0 in the equation (4), there is no necessity of addition, division or multiplication, such that no calculations are required, since the operation is that of directly copying the lower left pixel of the four pixels as the transformation unit of the domain block $D_k$ in the range block $R_k$. The result is that the processing volume is significantly smaller than in the case of FIG. 8, thus enabling the processing at a higher speed.

In the embodiment of FIG. 12, it is the lower left one of the four pixels as the transformation unit of the domain block Dk that is copied. However, it may obviously be any other one of the four pixels that is copied in this manner. As another example, the number of iteration of the iterative decoding loop is controlled in the controller 17 of FIG. 2. Specifically, the CPU 20 performs control through the graphics processing unit 22 in FIG. 2. Therefore, such a technique may be used in which the respective pixels of the pixel area as the transformation unit of the main block $D_k$ are cyclically copied depending on the number of iterations.

Figure 13:
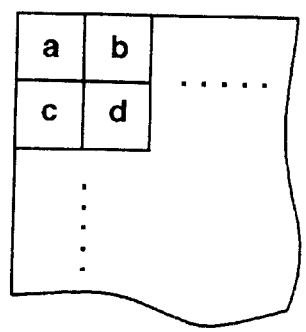
FIG. 13 shows an example in which the pixel values in the transformation unit of the domain block is cyclically used to give pixel values of the range block.

That is, FIG. 13 shows four pixels a, b, c and d in the area representing an optional transformation unit of the main block $D_k$. In this case, it suffices if one of the pixels is cyclically extracted in the sequence of a→b→c→d→ a→ . . . , depending on the number of times of iterations of the iterative decoding loop, for copying in the range block $R_k$. With this method, the picture quality of the picture generated on iterated transformation decoding is higher than if the same position pixel in the transformation unit is used as in FIG. 11.

Since the calculations of c=1 and b=0 in the equation (4) is carried out in the present embodiment for the iterated transformation decoding as discussed above, picture restoration from an optional picture, which is possible with the basic fractal decoding as described in the basic fractal decoding stated in the aforementioned treatise by Jaquin, is not possible. The reason is that, in the above-described system of the fourth embodiment, an initial picture of the black color (with all zero pixel values) remain black on repeated iterative transformation because the contract c=1 and the brightness b=0. In order to overcome this problem, the initial decoded picture restoration unit 19 is provided in order to use a pre-set decoded picture as an initial picture.

That is, since the initial decoded picture restoration unit 19 is provide for restoring the initial decoded picture in which to effect iterated transformation decoding, a decoded picture of improved picture quality can be obtained even with the use of the high-speed processing method of copying the value of a sole pixel in the transformation unit of the main block Dk discussed in connection with the fourth embodiment.

A fifth embodiment is hereinafter explained.

Figure 14:
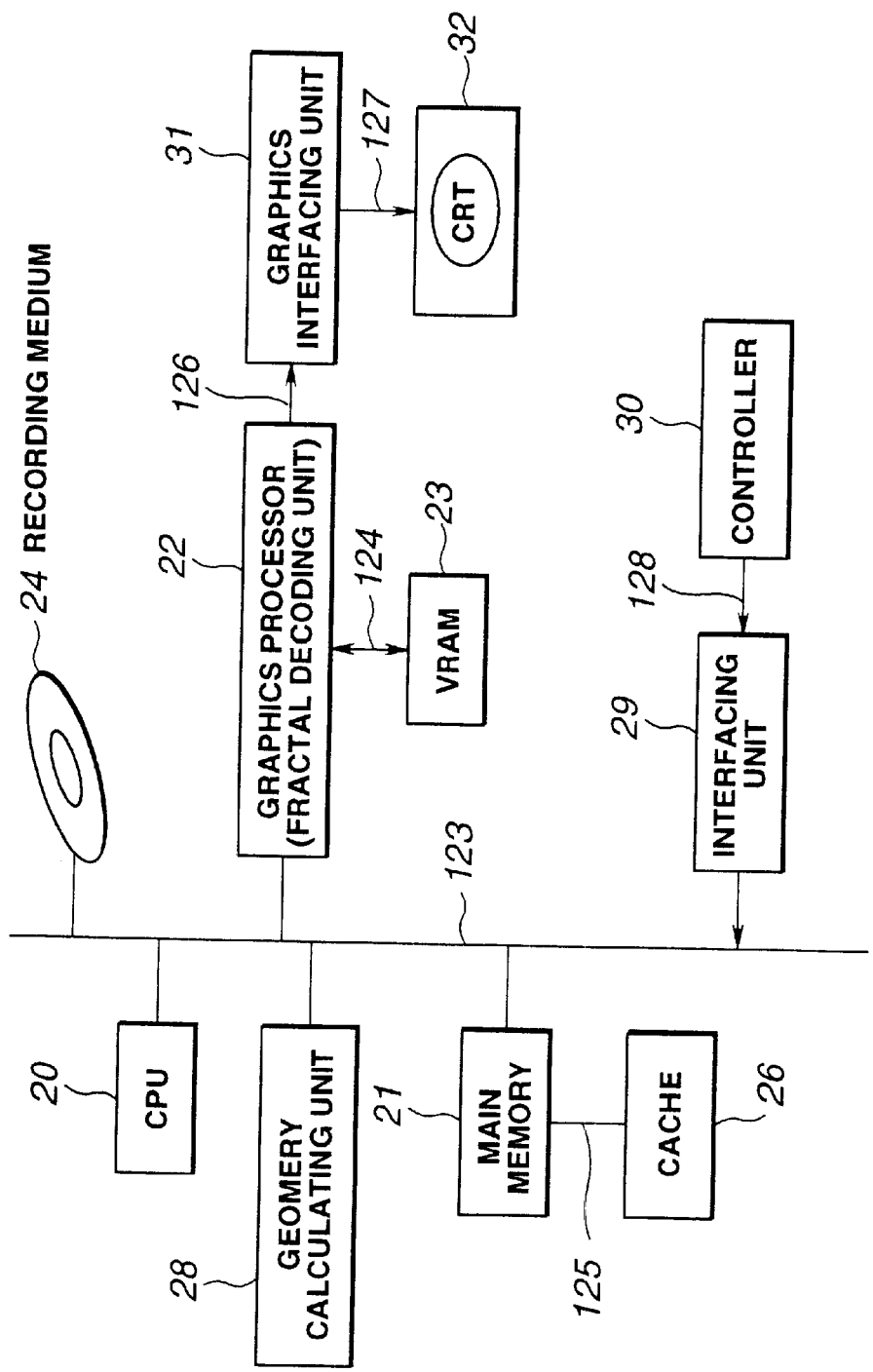
FIG. 14 is a schematic block diagram showing the structure of a device according to a fifth embodiment of the present invention.

FIG. 14 shows an example of adding a geometry calculating unit 28 in the structure of FIG. 2. It is possible with the geometry calculating unit 28 to effect fast calculations of the geometrical shape of a certain three-dimensional shape (referred to below as a polygon) when texture mapping a texture 126 restored on iterated transformation decoding by the graphics processing unit 22 to the polygon. If, based on the command information 128 issued by the controller 30, the movement of the polygon making up the character as an object of the game is to be changed, the processing of carrying out geometric calculations by the geometry calculating unit 28 and mapping the restored texture 126 to the polygon changed in movement to reflect the results is realized by the graphics processing unit 22.

With the present fifth embodiment, it is possible to calculate the geometrical information, such as coordinates, of the polygon on which to map the texture, in order to effect texture mapping on the generated polygon. The result is the extremely realistic texture-mapped picture.

A sixth embodiment is hereinafter explained.

In the above-described embodiments, the iterated transformation decoding in the graphics processing unit 22 is realized by the structure shown in the block diagram of FIG. 5. For example, for enlarging the polygon based on the command information 128 issued by the controller 30, it is necessary to enlarge the mapped texture in meeting with the enlargement ratio. In such case, the usual practice is to perform iterated transformation decoding using the fractal transformation parameters repeatedly on the drawing texture expanded on the VRAM 23 to converge the texture.

Figure 15:
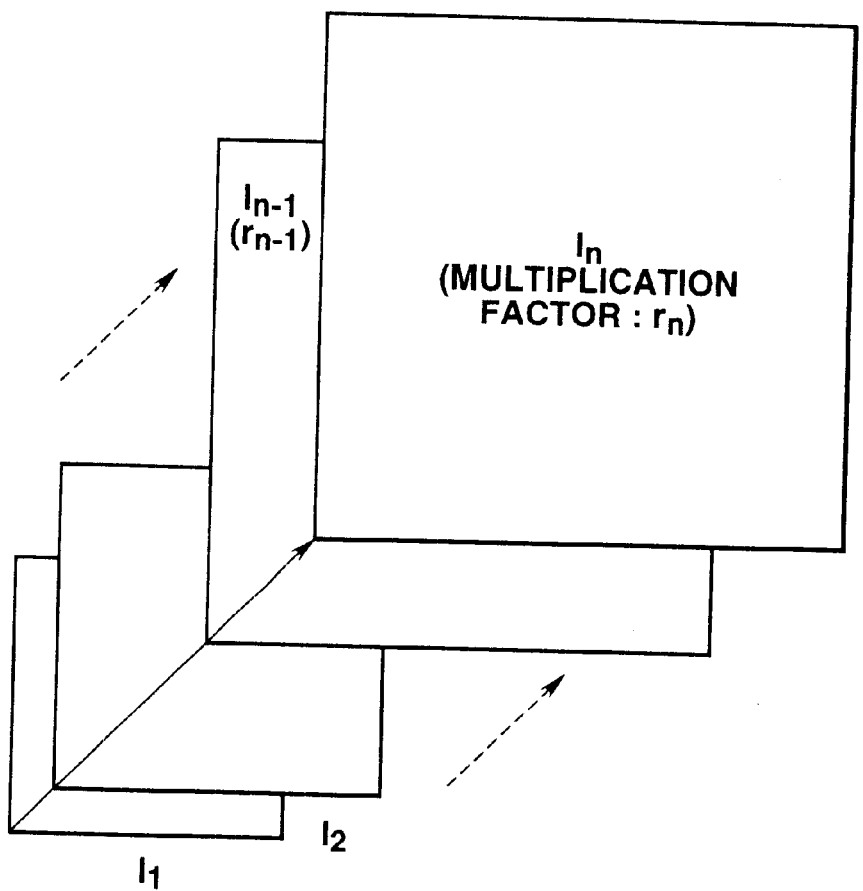
FIG. 15 shows a texture generated with an adjacent multiplication factor.

However, if the texture is to be zoomed in succession, the probability is high that the zooming ratio of the texture generated latest ($r_{n-1}$ of FIG. 15) is extremely close to the current zooming ratio $R_n$ of FIG. 15 ). In the case of FIG. 15, $r_{n-1} < r_n$. In such case, it suffices to execute fractal transformation parameters directly on the decoded texture of the previous zooming ratio $I_{n-1}$ to generate the texture $I_n$ as shown in FIG. 15. It is obvious that the processing volume can significantly be decreased in comparison with the case of repeatedly executing fractal transformation parameters from the outset. On the other hand, since the texture $I_{n-1}$ expanded on the VRAM 23 can be overwritten, the VRAM work area can be exploited effectively.

A seventh embodiment will now be explained.

In the fourth embodiment, it has been shown that calculations of four additions, one division and one multiplication, required in the iterated transformation decoding employing the conventional ½ contractive transformation, can be reduced to simple block copying. However, although there are many textures to which this technique can be applied sufficiently practically, there are occasions wherein the decoded picture is poor in picture quality for an extremely intricate texture. The present seventh embodiment is configured to cope with this situation.

Figure 16:
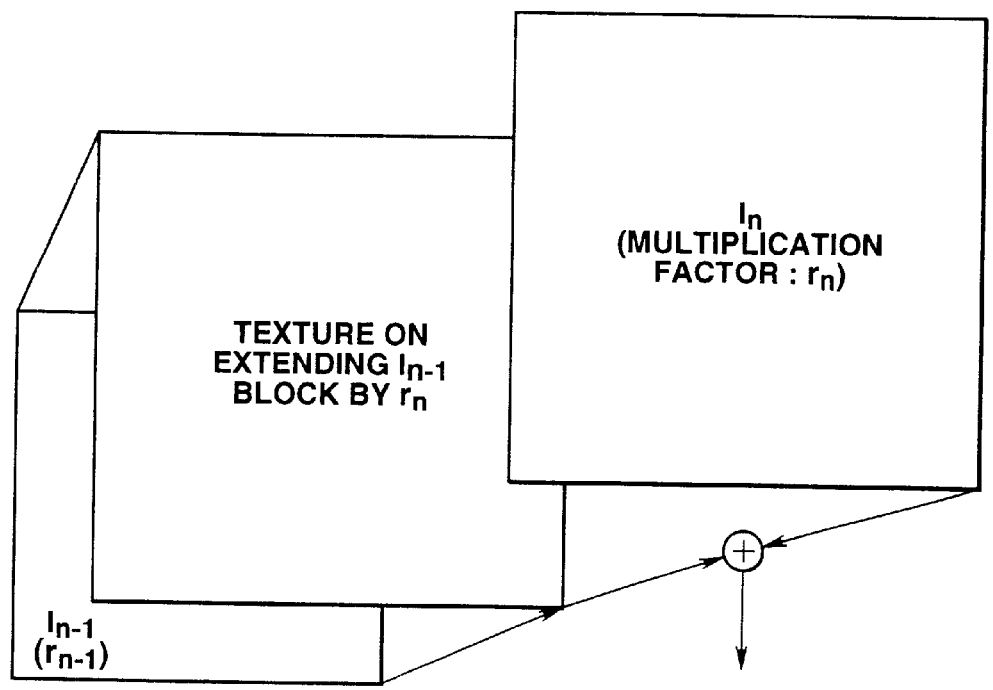
FIG. 16 shows generation of a new texture by synthesis of textures generated by adjacent multiplication factors.

Referring to FIG. 16, a mean value is taken between the texture obtained on pixel interpolation up to the multiplication factor $r_n$ of a decoded texture $I_{n-1}$ of two neighboring multiplication factors explained in connection with the sixth embodiment, and the texture $I_n$ restored from $I_{n-1}$ to provide a new decoded texture. For zooming the decoded texture $I_{n-1}$ up to the multiplication factor $r_n$, simple pixel interpolation can be used. This technique may be termed semi-transparent synthesis since the two textures are synthesized on the fifty-fifty basis.

On the other hand, the two textures A, B may be multiplied with a suitable multiplication factor to generate a new texture. For example, if (texture A)×0.7+(texture B)×0.3=new texture the two textures are synthesized with 70% to 30% ratio thus achieving equivalent results.

To summarize the above-described embodiments of the present invention, the CPU 20 of FIG. 2 causes the information (bitstream) for fractal decoding to be read out from the recording medium 24, such as CD-ROM or a ROM cassette, in which it is previously recorded, to send the zooming ratio etc used at the time of fractal decoding of the texture to the graphics processing unit 22 in accordance with the command from the controller 30. The CPU 20 also causes the main memory 21 to store and save the commands or fractal transformation parameters etc transiently to update the commands or parameters incidentally as the processing progresses. The graphics processing unit 22 receives the commands or fractal transformation parameters from the main memory 21 or the cache memory 26 connected to the mai memory 21 to effect fractal decoding as discussed above based on the texture (initial picture) expanded on the VRAM 23. The decoded texture is again expanded on the VRAM 23. This VRAM is a picture memory for storing and saving the picture data and the texture thereon is incidentally read or written by the graphics processing unit 22. The graphics interfacing unit 31 receives, as input, the picture expanded on the VRAM 23, including the fractal-decoded texture, to output the picture as analog picture signals, obtained on D/A conversion, to an analog TV.

The above-described embodiments of the present invention can be applied to an entertainment device, such as a game machine, and to other usages than the game machine, such as to the usage of picture information processing in need of high-speed decoding of fractal transform decoded data. In this case, the processing of decoding the iterative transformation coded codewords to restore the texture and of mapping the restored texture to a three-dimensional shaped polygon (texture mapping) can be effected speedily without employing a costly hardware employing a costly CPU. If the present invention is applied to an entertainment device, such as a game machine, it is possible to realize the agreeable responsiveness with an optimum picture quality at the time of zooming of the object shape to improve the sympathetic feeling to the game to enable the user to enjoy the game more fully.

What is claimed is:

1. A picture information processing apparatus comprising:
   main memory means for storage of data containing fractal transformation parameters;
   picture processing means for effecting iterated transformation decoding using the fractal transformation parameters stored in the main memory means to generate a picture;
   picture storage means for expanding a picture generated by said iterated transformation decoding;
   display control means for display-controlling the generated picture;
   actuation inputting means; and
   control means for controlling the processing by said picture processing means and the display operation by said display control means responsive to an actuating input from said actuation inputting means, wherein said picture processing means includes demultiplexing means for demultiplexing input bitstream data, domain block generating means for generating blocks based on the position information of the domain block, picture transformation and generating means for transforming and generating pictures based on transformation parameters, initial picture restoring means for restoring the initial picture used for decoding, a picture memory for storage and saving of the transformed domain block pictures and control means for effecting decoding iteration control.

2. A picture information processing apparatus comprising:
   main memory means for storage of data containing fractal transformation parameters;
   picture processing means for effecting iterated transformation decoding using the fractal transformation parameters stored in the main memory means to generate a picture;
   picture storage means for expanding a picture generated by said iterated transformation decoding;
   display control means for display-controlling the generated picture;
   actuation inputting means; and
   control means for controlling the processing by said picture processing means and the display operation by said display control means responsive to an actuating input from said actuation inputting means, wherein, at the time of iterated transformation decoding by said picture processing means, part of the plural pixels making up a transform unit in a domain block is directly copied in a range block to effect contractive picture transformation, wherein the pixels copied in the range block is extracted in plural pixels as transformation unit in the domain block from different positions depending on the number of times of the iterated transformation.

3. A picture information processing apparatus comprising:
   main memory means for storage of data containing fractal transformation parameters;

picture processing means for effecting iterated transformation decoding using the fractal transformation parameters stored in the main memory means to generate a picture;

picture storage means for expanding a picture generated by said iterated transformation decoding;

display control means for display-controlling the generated picture;

actuation inputting means; and control means for controlling the processing by said picture processing means and the display operation by said display control means responsive to an actuating input from said actuation inputting means, wherein said picture processing means includes initial picture restoring means for restoring an initial picture and generates a picture by iterated transformation decoding employing the fractal transformation parameters based on the restored initial picture, and wherein, when effecting zoom display using enlarged pictures of plural stages as a picture generated on iterated transformation decoding, an enlarged picture is generated by synthesizing a first picture generated on iterated transformation decoding based on another enlarged picture generated prior to said enlarged picture and a second picture generated by iterated transformation decoding based on said initial picture.

* * * * *